United States Patent [19]
Reed

[11] Patent Number: 6,126,367
[45] Date of Patent: Oct. 3, 2000

[54] PRECISION DRILL BIT

[76] Inventor: Gary Jack Reed, 1015 S. Soderquist Rd., Turlock, Calif. 95380

[21] Appl. No.: 09/053,525

[22] Filed: Mar. 31, 1998

[51] Int. Cl.$^7$ .................................................. B23B 51/02
[52] U.S. Cl. ........................................... 408/1 R; 408/230
[58] Field of Search ..................... 408/223, 224, 408/230, 715, 1 R, 227

[56] References Cited

U.S. PATENT DOCUMENTS

| | | | |
|---|---|---|---|
| 805,170 | 11/1905 | Thomas | 408/224 |
| 2,193,186 | 3/1940 | Bannister | 408/223 |
| 2,332,295 | 10/1943 | Bouchal | 408/230 |
| 2,334,845 | 11/1943 | Schwartz | 408/223 |
| 2,646,701 | 7/1953 | Letien | 408/223 |
| 3,779,664 | 12/1973 | Caley et al. | 408/230 |
| 4,480,952 | 11/1984 | Jeremias | 408/224 |
| 5,056,967 | 10/1991 | Hageman | 408/230 |
| 5,354,155 | 10/1994 | Adams | 408/224 |
| 5,387,059 | 2/1995 | Borzemsky | 408/230 |
| 5,570,978 | 11/1996 | Rees et al. | 408/224 |

*Primary Examiner*—Daniel W. Howell
*Attorney, Agent, or Firm*—Bernhard Kreten

[57] ABSTRACT

The following invention relates to a drill bit that will drill a round and precisely sized hole when using a hand-held drill motor. The bit has a unique multi-angle lip relief that cuts faster than a standard drill bit and stays sharp longer as well.

28 Claims, 3 Drawing Sheets

PRECISION DRILL BIT

FIELD OF THE INVENTION

This invention generally relates to drills. More particularly, this invention relates to hand-held or less than rigid drilling-type drills and their ability to originate cylindrical holes.

BACKGROUND OF THE INVENTION

Drills for originating cylindrical holes in a work piece have long been known. Many types of rigid machine controlled drilling operations, such as drill presses, produce acceptable results. However, hand-held or less than rigid drilling operations often produce sloppy, oversized, oblong or oval holes. This is especially troublesome with respect to drilling metals.

Historically, this has resulted in the need for first drilling a smaller hole and then using a precision reamer to complete a straight, precise, cylindrical hole. This two-step process can be cumbersome and time consuming, not to mention adversely affecting drill bit life due to friction heat build up on the cutting edges.

Hand-held or less than rigid drilling operations are further complicated by operator errors and slight changes of angle during the drilling process of a single hole. If this occurs, the cutting edges of the margin adjacent the flutes will cut into the sidewalls of the hole created by the cutting tip of the drill bit because the standard margin runs the length of the flutes. This results in improper removal of material and an oblong or oval hole.

The margin or major diameter of the drill bit determines the size of the hole based on the relative center of the chisel point and equal length of the cutting lips. The margin's benefit is in creating the diameter only at the end of the drill where it joins the cutting lip. If the margin extends the full length of the flute, as it does in common drill bits, its usefulness reverses and becomes detrimental to the precision hole created by the cutting lips. Transverse pressure and changes of angle allow the trailing margins to contact and cut into the sidewalls of the drilled hole.

SUMMARY OF THE INVENTION

In the present invention, an orientation surface is appropriately formed between the drill tip and flutes. As experience has shown, proper formation of that surface will cause the drill to slide instead of cutting unless oriented substantially toward the center of a cylindrical hole. This guide surface was previously unknown in the prior art and creates a secondary cutting lip angle heretofore unknown. Furthermore, a drill bit created with primary and secondary cutting lip angles can cut faster and stay sharp longer than conventional single primary angle drill bits. Also, a drill bit with a narrow chisel point cuts easier and stays sharp longer with less drilling pressure.

Furthermore, by limiting the ability of the drill to cut save for at or near the tip, inadvertent angular cutting may be avoided. By creating a drill bit with a very small amount of margin adjacent the cutting lips only, the comparatively undersized flute of the drill bit cannot cut into the sidewall because it has no relief or land to allow cutting to occur. A drill bit with a flute with such limited margin cannot cut radially into the side of the hole.

OBJECTS OF THE INVENTION

The overall object of the invention is to cause a drill to only cut non-ovular holes. By appropriately forming a relief surface, the surface between the drill tip and the drill flutes, and limiting the margin along the flutes of the drill, a drill will not cut into a work surface unless the drill stays true to the hole.

It is an object of the present invention to provide a drill which will cut only substantially cylindrical holes.

It is a corollary object of the present invention to provide a drill which will not cut oval holes.

It is another object of the present invention to provide a drill having no cutting edges or surfaces present along its side, but rather, only at its end.

It is another object of the present invention to provide a drill with reduced drag, reduced heat build-up, increased cutting aggressiveness and increased cutting speed.

It is another object of the present invention to provide a drill for hand-held drilling devices that will accomplish the above-mentioned objectives.

It is another object of the present invention to provide a drill that will maintain reduced friction on the drill body, thereby increasing the life of the drill.

It is another object of the present invention to provide a drill that will drill cylindrical holes faster.

Viewed from a first vantage point, it is an object of the present invention to provide a drill bit, comprising, in combination, a shank, the shank having a surface to be received by a turning implement, the shank transitioning away from the surface which receives the turning implement into a body having a flute penetrating into the body to provide a channel, the body leading to a free cutting end which initiates penetration when forming a bore, the free cutting end including a lip relief means for precluding unwanted drill bit cutting (except when an angle of drilling is in a prescribed orientation).

Viewed from a second vantage point, it is an object of the present invention to provide a drill comprising, in combination, a shank at one end, a cutting tip at an opposite end and a plurality of flutes therebetween, and a lip relief surface means at a juncture between the flutes and the tip, the lip relief surface means including a cutting burr at a leading edge.

Viewed from a third vantage point, it is an object of the present invention to provide a method for boring a cylindrical cavity, the steps comprising, providing a drill, forming a cutting preclusion means integrally with the drill, coupling the drill to a hand-held turning means, turning the drill, aligning the drill along a long axis wherein the drill contacts a material to be drilled, drilling a bore within the material while retaining the drill on the long axis, and precluding drilling of the material when the drill is offset from the long axis via the cutting preclusion means.

These and other objects will be made manifest when considering the following detailed specification when taken in conjunction with the appended drawing figures.

DESCRIPTION OF PREFERRED EMBODIMENTS

Figures 1, 2:
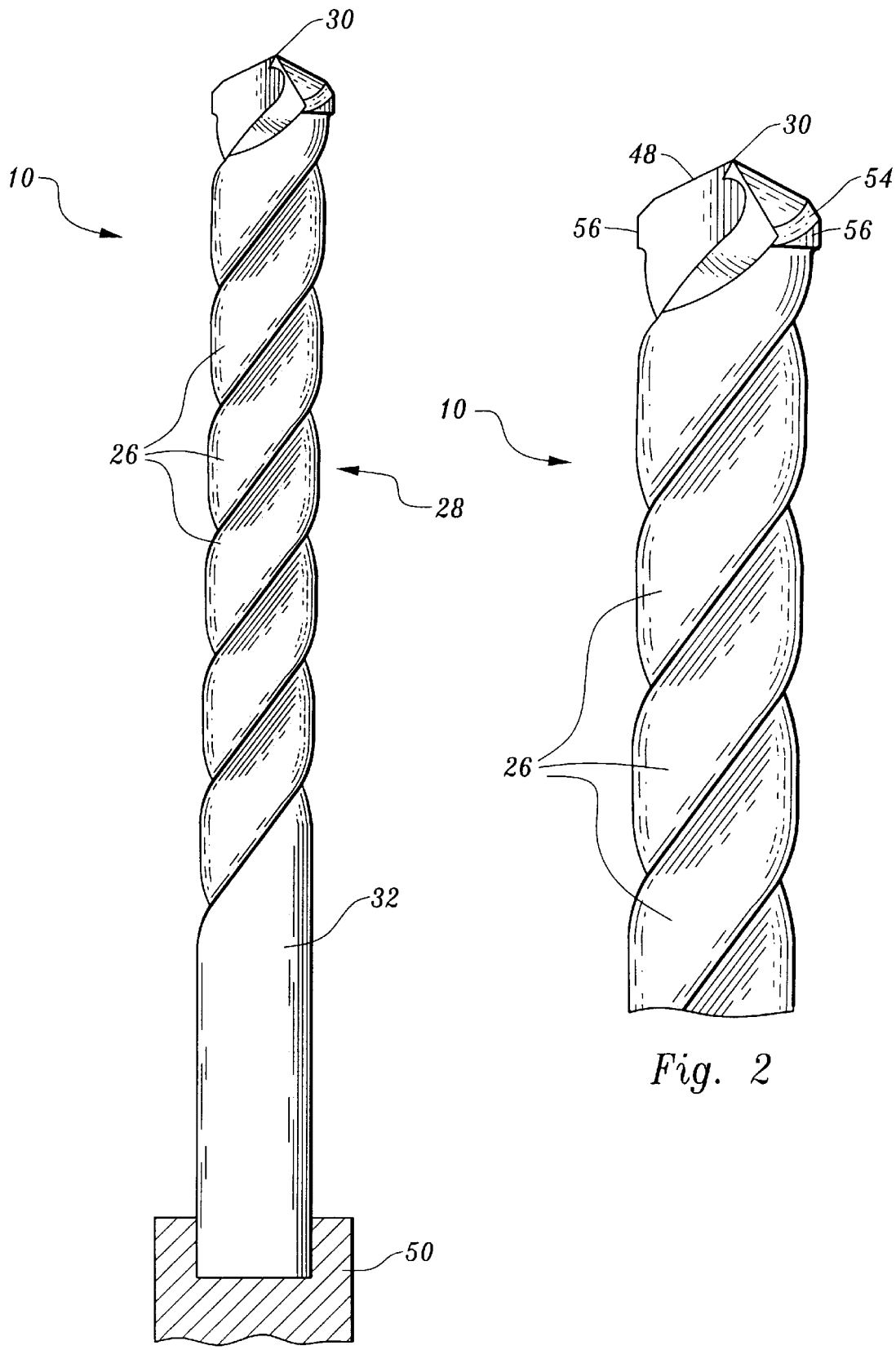
FIG. 1 is a front view of the drill according to the present invention.
FIG. 2 is a front view of the top point of the drill according to the present invention.

Considering the drawings, wherein like reference numerals denote like parts throughout the various drawing figures, reference numeral 10 is directed to the drill according to the present invention.

Figure 4:
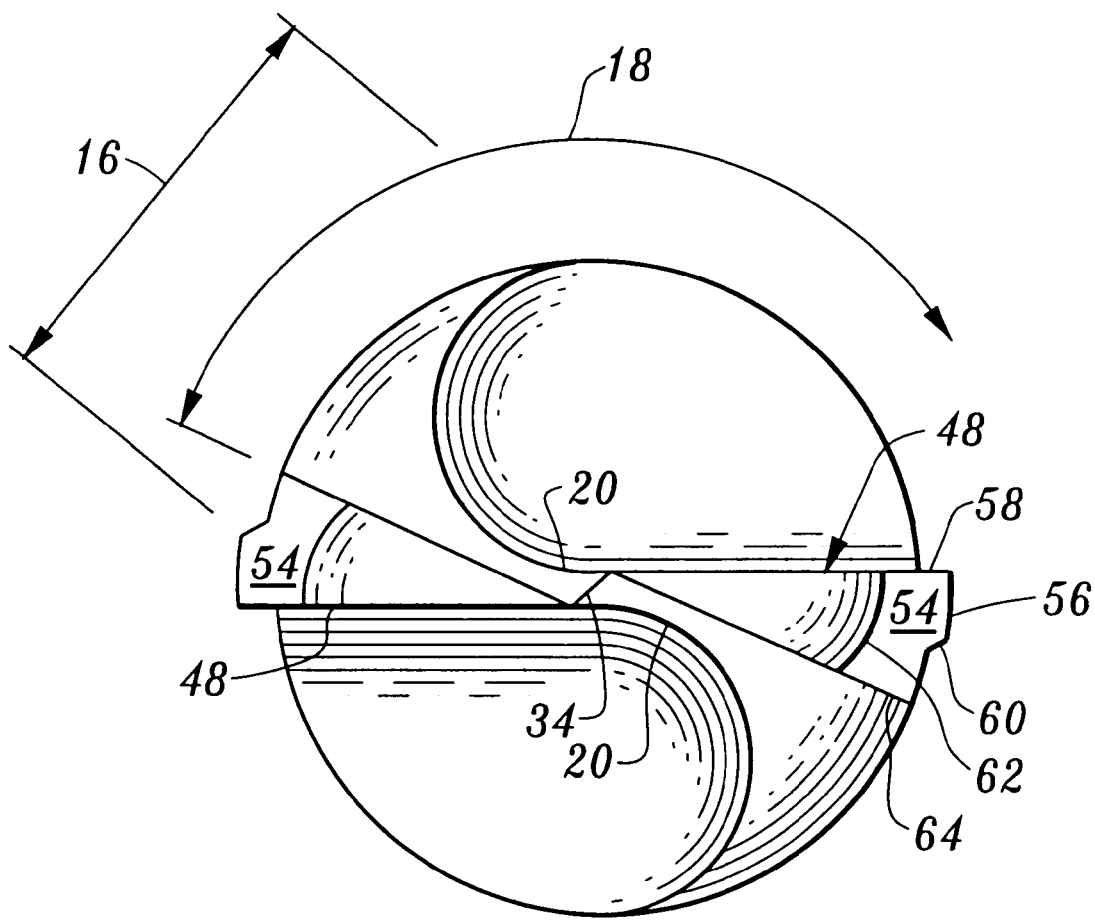
FIG. 4 is a planar view of the drill according to the present invention.

Referring now to FIGS. 1 and 2, a shank 32 is received and mounted by turning device 50. Thereafter the shank 32 transitions into a body 28 of the drill 10. Body 28 is helically transposed about flute 26. Flute 26 is a channel for removing chips or curls from the work surface and/or allowing lubricants or coolants to reach the tip of the drill 10. A leading edge of flute 26 at margin 56 forms a cutting lip 48 which, when taken toward the tip of the drill, transitions into an orientation surface 54. That orientation surface 54 will aid a drill operator in orienting the drill bit 10 only in a manner which will cause a cylindrical hole to be formed and provide better cutting reaction at or near the chisel edge 34 (FIG. 4). Furthermore, margin 56, extending only a short portion down the flutes of the drill 10, prevents unwanted cutting further down the drill shaft.

FIG. 4 defines a planar view of the drill. In that planar view looking down on the tip of the drill, the drill web 20 can be seen. The web 20 is the central section that connects the two outer flute portions of the drill. The land 16 of the drill can be seen behind the margin 56 in FIG. 4. Orientation surface 54 is defined by margin 56, wherein margin 56 has a trailing edge 60 and a leading edge 58, and further defined by arcuate transition 62 and demarcation edge 64. These resultant points provide secondary lip angles that further the cutting enhancement near the tip.

Figure 3A:
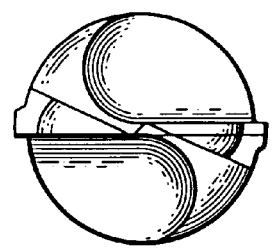
FIG. 3A is an end view of the top point of the drill.
Figure 3B:
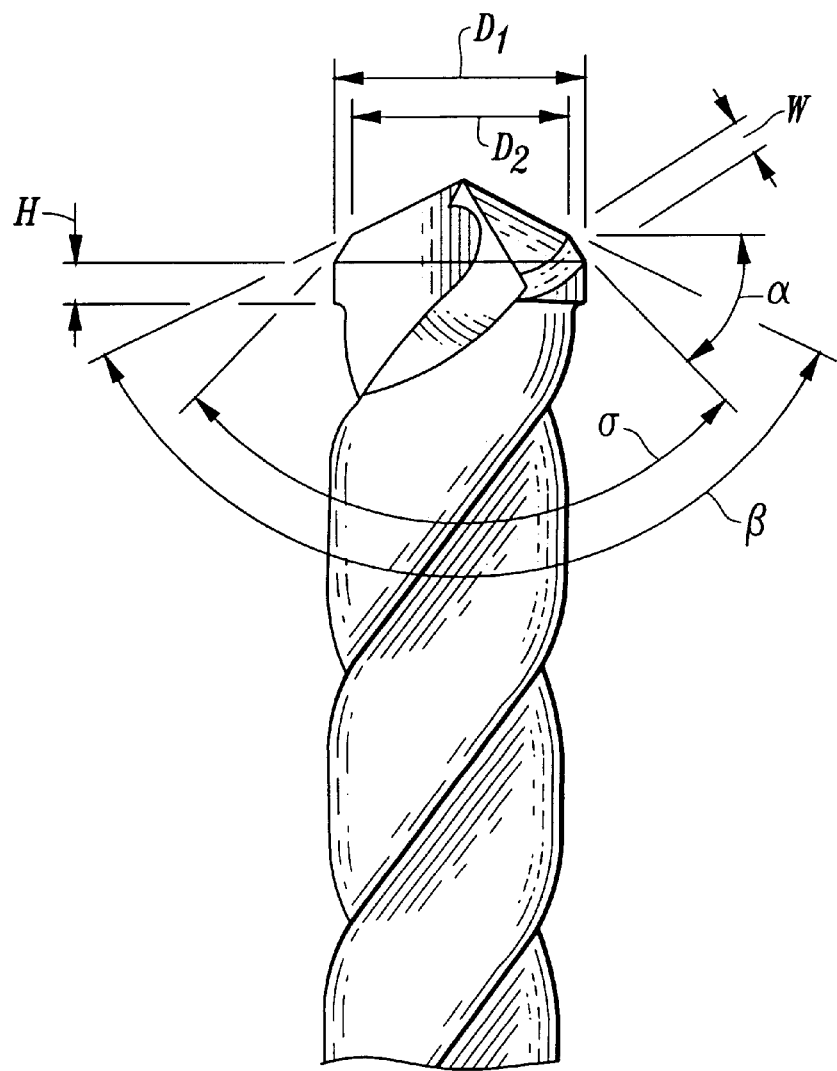
FIG. 3B is a front view of the top point of the drill of the present invention showing angular and dimensional data.

Focusing on orientation surface 54 in FIG. 2, it can be seen that orientation surface 54 is at a different angle from the rest of the point of the drill 10 and the body 28 of the drill 10. This orientation surface angle $\alpha$, as depicted in FIG. 3, is significant. In a preferred form of the invention, the orientation surface angle $\alpha$ is defined to be within the 40° to 45° range and is preferably approximately 45°. The orientation surface angle $\alpha$ is set off from a line perpendicular to the drill axis and orientation point angle $\theta$. On the other hand, the point angle $\beta$ is preferably 135° or 118°, as is standard for such drills. When the point angle $\beta$ is preferably 135°, the orientation point angle $\theta$ is preferably 90°. As can be further seen in FIG. 3, the orientation surface has a width W, while the margin has a height H and a thickness equal to an outer diameter $D_1$ less an inner diameter $D_2$. Although the height of the margin on standard drills may extend the entire shaft or length of the flutes, it is preferred in this invention that the height H of the margin 56 be substantially less than the length of the shaft, and preferably, one half of $D_1$ or about the radius of the drill.

It has been discovered that, by establishing the arcuately shaped orientation surface 54 with an angle $\alpha$ of preferably 45°, and coupling that with the limited margin 56, when drilling a hole, the unwanted angular orientation of the drill will result in no cutting. On the other hand, if the operator of the drill orients the drill 10 in a manner true to the cylindrical orientation of the hole, the drill 10 will efficiently and expeditiously cut a cylindrical hole.

In use and operation, one orients the drill 10 on a work surface to drill a hole in a manner as required by the operator. Once the hole is started by the cutting forces between the point 30 and the lips 48, cutting will commence toward and past orientation surface 54 and margin 56. The cutting forces at margin 56 will continue the hole in a cylindrical fashion. However, any misorientation of the drill will be corrected by orientation surface 54 and unwanted cutting will not result due to the limited length of the cutting surface on margin 56. That is, should the drill 10 become misoriented, there is not enough cutting surface on the margin 56 extending down the flutes 26 to cause any cutting unless oriented in a true fashion to the center of the hole.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A drill bit, comprising, in combination:

a shank;

said shank having a surface to be received by a turning implement;

said shank transitioning away from said surface which receives the turning implement into a body having a flute penetrating into said body to provide a channel;

said body leading to a free cutting end which initiates penetration when forming a bore;

said free cutting end including a lip relief means for precluding unwanted drill bit cutting except when an angle of drilling is in a prescribed orientation, said lip relief means transitioning into a radially outwardly extending longitudinal margin having a greater diameter than the diameter of said body.

2. The bit of claim 1, wherein:

said free cutting end includes a tip at an extremity of said free cutting end remote from said shank;

said tip transitioning into an edge of said lip relief means;

said edge, in turn, transitioning into a relief surface of said lip relief means;

said relief surface terminating into said margin; and said margin transitioning into said body.

3. The bit of claim 2 wherein said lip relief means encourages reorientation for correct alignment without cutting.

4. The bit of claim 3 wherein said relief surface is subtended by said lip and edge which converge to a point, thereby defining a subtended angle greater than 40°.

5. The bit of claim 4 wherein said transition from said edge to said relief surface is defined by an angle of 45°.

6. A drill comprising, in combination:

a shank at one end;

a cutting tip at an opposite end and a plurality of flutes therebetween;

and a lip relief surface means at a juncture between said flutes and said tip, said lip relief surface means including a cutting burr at a leading edge projecting radially outwardly from said tip.

7. The drill of claim 6, wherein said lip relief surface means is inclined relative to a line drawn perpendicular to a long axis of said drill and relative to said flutes, where said inclination is greater than 40°.

8. The drill of claim 7, wherein said lip relief surface means inclination is substantially 45°.

9. The drill of claim 8 wherein said cutting burr defines a margin, said margin extending substantially less that the length of said flutes.

10. The drill of claim 9 wherein said margin extends a distance from said tip not greater than a radius of a cylindrical body of the drill.

11. A method for boring a cylindrical cavity, the steps comprising:

providing a drill;

forming a cutting preclusion means integrally with the drill;

forming a radially outwardly extending cutting burr on the drill;

coupling the drill to a hand-held turning means;

turning the drill;

aligning the drill along a long axis wherein said drill contacts a material to be drilled;

drilling a bore within the material while retaining the drill on the long axis; and precluding drilling of the material when the drill is offset from the long axis via the cutting preclusion means.

12. The method of claim 11 wherein the cutting preclusion means formation step further comprises limiting the drill cutting surface to substantially about a tip of the drill.

13. The method of claim 12 wherein the cutting preclusion means formation step further comprises providing non-cutting surfaces along substantially an entire shaft of the drill.

14. A drill comprising, in combination:

a body having first and second ends;

a shank at said body first end;

a tip at said body second end;

said body transposed about a flute between said shank and said tip;

a margin outwardly extending from said tip and said body radially;

said margin extending downward from said tip along said body a distance less than the entire length of said flute; and an orientation surface transitioning between said tip and said margin for aiding the drill operator in orienting the drill only in a manner to cause a cylindrical hole to be formed along a central hole axis.

15. The drill of claim 14 wherein said margin extends downward from said tip a distance substantially less than the entire length of said flute.

16. The drill of claim 15 wherein said margin includes a radially outwardly projecting cutting edge and said margin circumferentially transitions from said cutting edge toward a trailing edge and said trailing edge circumferentially slopes into said body.

17. The drill of claim 15 further comprising a point on said tip, wherein said orientation surface lies between said point and said margin.

18. The drill of claim 17 wherein said margin extends downward from said orientation surface preferably about equal to the radius of the drill wherein the radius is measured including said margin.

19. The drill of claim 18 wherein said orientation surface is inclined relative to a line drawn perpendicular to a horizontal axis of the drill and relative to the angle of inclination of said point, wherein said orientation surface inclination angle lies in a range of about 40° and 45°.

20. The drill of claim 19 wherein said orientation surface inclination angle is preferably 45°.

21. A drill comprising, in combination:

a body having first and second ends;

a shank coupled to said first end;

a multifaceted tip coupled to said body second end;

said body transposed about a flute between said shank and said tip; and a margin radially extending away from said body and transitioning into said multifaceted tip, said multifaceted tip including a first facet and a second facet, wherein said first facet angularly depends between said margin and said second facet.

22. The drill of claim 21 wherein said margin extends downward from said second facet along said body a distance less than the entire length of said flute.

23. The drill of claim 22 wherein said second facet includes an orientation means for aiding the drill operator in orienting the drill only in a manner to cause a cylindrical hole to be formed.

24. The drill of claim 23 wherein said margin extends downward from said second facet a distance substantially less than the entire length of said flute.

25. The drill of claim 24 wherein said margin includes a radially outwardly projecting cutting edge and said margin circumferentially transitions from said cutting edge toward a trailing edge and said trailing edge circumferentially slopes into said body.

26. The drill of claim 25 wherein said margin extends downward from said second facet preferably about equal to the radius of the drill.

27. The drill of claim 26 wherein said second facet is inclined relative to a line drawn perpendicular to a long axis of the drill and relative to an orientation point angle, wherein said inclination angle of said second facet is in a range of substantially 40–45°.

28. The drill of claim 27 wherein said second facet inclination angle is preferably 45°.

* * * * *